United States Patent
Lee

(10) Patent No.: US 12,492,533 B2
(45) Date of Patent: Dec. 9, 2025

(54) SYSTEM AND METHOD OF CONTROLLING CONSTRUCTION MACHINERY

(71) Applicant: HD HYUNDAI INFRACORE CO., LTD., Incheon (KR)

(72) Inventor: Cavin Lee, Yongin-si (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 563 days.

(21) Appl. No.: 17/574,945

(22) Filed: Jan. 13, 2022

(65) Prior Publication Data

US 2022/0220705 A1    Jul. 14, 2022

(30) Foreign Application Priority Data

Jan. 14, 2021  (KR) .................. 10-2021-0005182

(51) Int. Cl.
*G06V 20/56* (2022.01)
*B60R 1/22* (2022.01)
(Continued)

(52) U.S. Cl.
CPC ............. *E02F 9/26* (2013.01); *B60R 1/22* (2022.01); *G06V 20/56* (2022.01); *H04N 5/2621* (2013.01);
(Continued)

(58) Field of Classification Search
None
See application file for complete search history.

(56) References Cited

U.S. PATENT DOCUMENTS

2016/0325753 A1* 11/2016 Stein ................. B60G 17/0182
2016/0344931 A1* 11/2016 Husted ................ H04N 23/698
(Continued)

FOREIGN PATENT DOCUMENTS

| CN | 107532410 A | 1/2018 |
|---|---|---|
| CN | 111587448 A | 8/2020 |

(Continued)

OTHER PUBLICATIONS

Office Action issued on Jan. 18, 2023, for corresponding Chinese patent application No. 202210039261.9, along with an English translation (13 pages).
(Continued)

*Primary Examiner* — Incent Rudolph
(74) *Attorney, Agent, or Firm* — Hauptman Ham, LLP

(57) ABSTRACT

A control system for construction machinery includes an upper camera installed in a driver cabin in a rear body to photograph the front of the driver cabin, a lower camera installed in a front body rotatably connected to the rear body to photograph the front of the front body, an image processing device configured to synthesize first and second images captured from the upper camera and the lower camera into one image, and configured to detect a shape of a front work apparatus in the first image to determine a steering angle of the front body and determine a position of a transparency processing area in which at least one of the first and second images is transparency-processed in the synthesized image according to the steering angle, and a display device configured to display the synthesized image transparency-processed by the image processing device.

13 Claims, 7 Drawing Sheets

(51) Int. Cl.
   *E02F 9/26* (2006.01)
   *H04N 5/262* (2006.01)
   *H04N 5/265* (2006.01)
   *H04N 23/90* (2023.01)

(52) U.S. Cl.
   CPC ............ *H04N 5/265* (2013.01); *H04N 23/90* (2023.01); *B60R 2300/105* (2013.01); *B60R 2300/303* (2013.01)

(56) References Cited

U.S. PATENT DOCUMENTS

2017/0016210 A1   1/2017   Kowatari et al.
2020/0347579 A1*  11/2020  Hama ..................... E02F 9/267

FOREIGN PATENT DOCUMENTS

| CN | 111764456 A | 10/2020 | |
|---|---|---|---|
| EP | 2712969 A1 | 4/2014 | |
| EP | 3342942 A1 | 7/2018 | |
| EP | 3666977 A1 | 6/2020 | |
| EP | 3848516 A1 | 7/2021 | |
| WO | WO-2017037267 A1 * | 3/2017 | ............... B60R 1/00 |

OTHER PUBLICATIONS

Extended European Search Report issued Jun. 7, 2022, corresponding to European Application No. 22150992.0.

* cited by examiner

SYSTEM AND METHOD OF CONTROLLING CONSTRUCTION MACHINERY

CROSS-REFERENCE TO RELATED APPLICATIONS

This application claims priority under 35 U.S.C. § 119 to Korean Patent Application No. 10-2021-0005182, filed on Jan. 14, 2021 in the Korean Intellectual Property Office (KIPO), the contents of which are herein incorporated by reference in their entirety.

BACKGROUND

1. Field

Example embodiments relate to a control system and method for construction machinery. More particularly, example embodiments relate to a control system for recognizing forward obstacles when working or driving construction machinery such as a wheel loader, an excavator, etc., and a method of controlling construction machinery using the same.

2. Description of the Related Art

In general, construction machinery such as a wheel loader, an excavator, etc., is widely used to excavate sand, gravel, and the like and load it into a dump truck. These works may be performed by driving a work apparatus installed in the construction machinery such as a bucket and a boom. However, the work apparatus may obstruct or limit an operator's front view while driving, and thus, obstruction of the operator's front view by the work apparatus may cause a safety accident.

SUMMARY

Example embodiments provide a control system for construction machinery capable of improving forward visibility limited by a work apparatus.

Example embodiments provide a control method for construction machinery using the control system.

According to example embodiments, a control system for construction machinery includes an upper camera installed in a driver cabin in a rear body to photograph the front of the driver cabin, a lower camera installed in a front body rotatably connected to the rear body to photograph the front of the front body, an image processing device configured to synthesize first and second images captured from the upper camera and the lower camera into one image, and configured to detect a shape of a front work apparatus in the first image to determine a steering angle of the front body and determine a position of a transparency processing area in which at least one of the first and second images is transparency-processed in the synthesized image according to the steering angle, and a display device configured to display the synthesized image transparency-processed by the image processing device.

In example embodiments, the image processing device may include a shape recognizer configured to recognize the shape of the front work apparatus from the first image to determine the steering angle of the front body and a transparency processor configured to determine the position of the transparent processing area in the synthesized image according to the determined steering angle.

In example embodiments, the shape recognizer may compare an actual image of the front work apparatus in the first image with a learning image of the front work apparatus recognized and stored in advance by machine learning to determine the steering angle of the front work apparatus.

In example embodiments, the image processing device may further include a storage portion configured to store a learning image of the front work apparatus by executing a deep learning algorithm using the actual image received from the shape recognizer as input data.

In example embodiments, the control system for construction machinery may further includes a work apparatus posture detection portion configured to detect a posture of the front work apparatus, and the image processing device may transparency-process at least one of the first and second images in the transparency processing area according to the posture of the work apparatus detected by the work apparatus posture detection portion.

In example embodiments, the image processing device may transparency-process the first image in the synthesized image when at least a portion of the work apparatus invades a predetermined position, and the image processing device may transparency-process the second image in the synthesized image when the work apparatus does not invade the predetermined position.

In example embodiments, the control system for construction machinery may further includes an input portion configured to set an image processing condition in the image processing device.

In example embodiments, the image processing condition may include a transparency processing switching timing of the first and second images or a size of the transparency processing area of the entire display area of the display device.

According to example embodiments, a control system for construction machinery includes an upper camera installed in a driver cabin in a rear body to photograph the front of the driver cabin, a lower camera installed in a front body rotatably connected to the rear body to photograph the front of the front body, an image processing device configured to synthesize first and second images captured from the upper camera and the lower camera into one image, and configured to detect a shape of a front work apparatus in the first image to determine whether or not the front body turns and determine a position of a transparency processing area in which at least one of the first and second images is transparency-processed in the synthesized image depending on whether or not the front body turns, and a display device configured to display the synthesized image transparency-processed by the image processing device.

In example embodiments, the image processing device may recognize the shape of the front work apparatus from the first image to determine a steering angle of the front body, and may determine the position of the transparent processing area in the synthesized image according to the determined steering angle.

According to example embodiments, in a method of controlling construction machinery, a first image of the front of a driver cabin from an upper camera installed in the drive cabin in a rear body is obtained. A second image of the front of a front body from a lower camera installed in the front body rotatably connected to the rear body is obtained. A shape of a front work apparatus is detected from the first image to determine a steering angle of the front body. The first and second images are synthesized into one image. A position of a transparency processing area in the synthesized image is determined according to the steering angle. At least one of the first and second images is transparency-processed in the transparency processing area. The transparency-processed image is displayed through a display device.

In example embodiments, determining the steering angle of the front body from the first image may include comparing an actual image of the front work apparatus in the first image with a learning image of the front work apparatus recognized and stored in advance by machine learning to determine the steering angle of the front work apparatus.

In example embodiments, the method may further include obtaining the learning image of the front work apparatus by executing a deep learning algorithm using the actual image as input data.

In example embodiments, the method may further include detecting a posture of the front work apparatus, and transparency-processing the at least one of the first and second images in the transparency processing area may include transparency-processing the at least one of the first and second images according to the detected posture of the front work apparatus.

In example embodiments, the method may further include setting an image processing condition for transparency processing of the first and second images.

In example embodiments, the image processing condition may include a transparency processing switching timing of the first and second images or the transparency processing area of the entire display area of the display device.

According to example embodiments, a control device for construction machinery may synthesize a first image and a second image captured from an upper camera installed in a driver cabin and a lower camera installed in a front body into one image, determine a position of a transparency processing area in the synthesized image according to a steering angle of the front body, transparency-process at least one of the first and second images to be transparent in the transparency processing area according to a position of a bucket or a boom connected to the front body, and display the transparency-processed image through a display device.

The position of the transparency processing area may be determined in the synthesized image to be matched with the steering angle of the front body, and at least one of the first image and the second image may be transparency-processed in the transparency processing area according to the posture of the work apparatus such as the position of the bucket or the boom, to thereby remove a blind spot that is obscured by the front work apparatus. Thus, an operator's cognitive ability may be increased to secure stability, to thereby prevent safety accidents.

Further, the transparency processing area may be set according to the operator's selection, thereby improving the degree of freedom in using the transparency processed image, and an efficient system configuration may be provided.

However, the effect of the inventive concept may not be limited thereto, and may be expanded without being deviated from the concept and the scope of the present invention.

BRIEF DESCRIPTION OF THE DRAWINGS

Example embodiments will be more clearly understood from the following detailed description taken in conjunction with the accompanying drawings.

DETAILED DESCRIPTION OF EXAMPLE EMBODIMENTS

Figure 1:
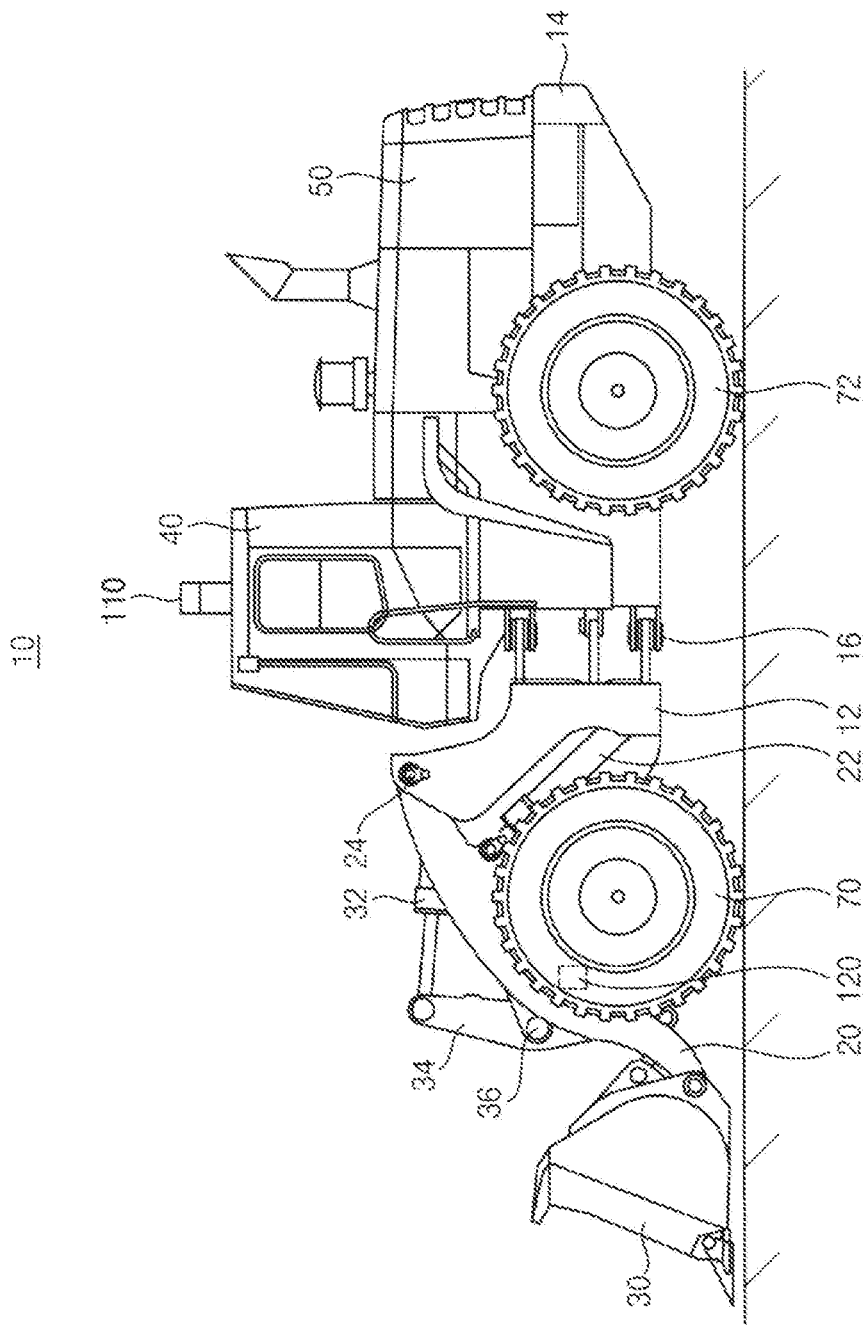
FIG. 1 is a side view illustrating construction machinery in accordance with example embodiments.

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

FIG. 1 is a side view illustrating construction machinery in accordance with example embodiments. Although a wheel loader 10 is illustrated in FIG. 1, a control device of construction machinery according to example embodiments is not limited to being used only in the wheel loader, but may be applied to an industrial vehicle such as an excavator, a forklift, etc. Hereinafter, for convenience of description, only the wheel loader 10 will be described.

Referring to FIG. 1, construction machinery 10 may include a vehicle body 12, 14, a driver cabin 40, and a work apparatus. The vehicle body of the wheel loader 10 in FIG. 1 may include, for example, a front body 12 and a rear body 14 rotatably connected to each other. The front body 12 may include the work apparatus and a front wheel 70. The rear body 14 may include the driver cabin 40, an engine bay 50 and a rear wheel (not illustrated).

The work apparatus may include a boom 20 and a bucket 30. The boom 20 may be freely pivotally attached to the front body 12, and the bucket 30 may be freely pivotally attached to an end portion of the boom 20. The boom 20 may be coupled to the front body 12 by a pair of boom cylinders 22, and the boom 20 may be pivoted upwardly and downwardly by expansion and contraction of the boom cylinders 22. A tilt arm 34 may be freely rotatably supported on the boom 20, almost at its central portion. One end portion of the tilt arm 34 may be coupled to the front body 12 by a pair of bucket cylinders 32 and another end portion of the tilt arm 34 may be coupled to the bucket 30 by a tilt rod, so that the bucket 30 may pivot (crowd and dump) as the bucket cylinder 32 expands and contracts.

Additionally, the front body 12 and the rear body 14 may be rotatably connected to each other through a center pin 16 so that the front body 12 may swing side to side with respect to the rear body 14 by expansion and contraction of a steering cylinder (not illustrated).

A travel apparatus for driving the wheel loader 10 may be mounted in the rear body 14. An engine (not illustrated) may be provided in the engine bay to supply an output power to the travel apparatus. The travel apparatus may include a torque converter, a transmission, a propeller shaft, axles, etc. The output power of the engine may be transmitted to the front wheel 70 and the rear wheel 72 through the torque converter, the transmission, the propeller shaft and the axles, and thus the wheel loader 10 may travels.

A hydraulic pump (not illustrated) for supplying a pressurized hydraulic oil to the boom cylinder 22 and the bucket cylinder 32 of the work apparatus may be mounted at the rear body 14. The hydraulic pump may be driven using at least a portion of the power outputted from the engine. For example, the output power of the engine may drive the hydraulic pump for the work apparatus and a hydraulic pump for the steering cylinder via a power transmission device such as a gear train.

The hydraulic pump may supply the hydraulic oil to drive the work apparatus, and may be divided into a variable capacity type and a constant capacity type. A pump control device (EPOS, Electronic Power Optimizing System) may be connected to the variable capacity hydraulic pump, and an amount of the hydraulic oil discharged from the variable capacity hydraulic pump may be controlled by the pump control device. A main control valve (MCV) including a boom control valve and a bucket control valve may be installed on a hydraulic circuit connected to the hydraulic pump. The hydraulic oil discharged from the hydraulic pump may be supplied to the boom cylinder 22 and the bucket cylinder 32 through the boom control valve and the bucket control valve of the main control valve MCV. The main control valve (MCV) may supply the hydraulic oil discharged from the hydraulic pump to the boom cylinder 22 and the bucket cylinder 32 according to a pilot pressure signal in proportion to an operation rate of an operating lever. Thus, the boom 20 and the bucket 30 may be driven by the pressure of the hydraulic oil discharged from the hydraulic pump.

The driver cabin 40 may be installed on the vehicle body of the construction machinery, and in case of the wheel loader, the drive cabin 40 may be installed on the rear body 14. A maneuvering device may be provided within the driver cabin 40. The maneuvering device may include an acceleration pedal, a brake pedal, an FNR travel lever, the operating levers for operating the cylinders such as the boom cylinder 22 and the bucket cylinder 32, a steering device such as a steering wheel for actuating the steering cylinder, etc.

As mentioned above, the wheel loader 10 may include a traveling operating system for driving the travel apparatus via the power transmission device and a hydraulic operating system for driving the work apparatus such as the boom 20 and the bucket 30 using the output power of the engine 100.

Hereinafter, a control system for the construction machinery will be explained using the wheel loader as an example.

Figure 2:
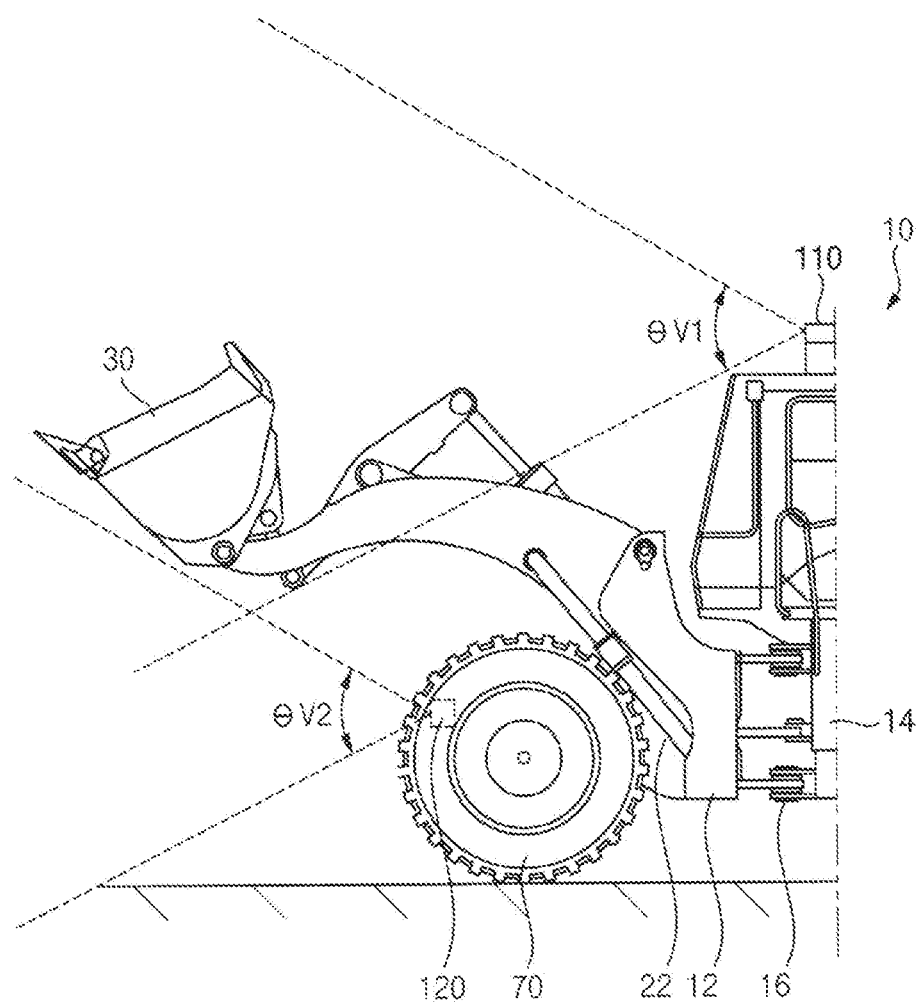
FIG. 2 is a side view illustrating vertical viewing angles of an upper camera and a lower camera at an elevation position of a bucket according to a rotation angle of the boom in FIG. 1.
Figure 3:
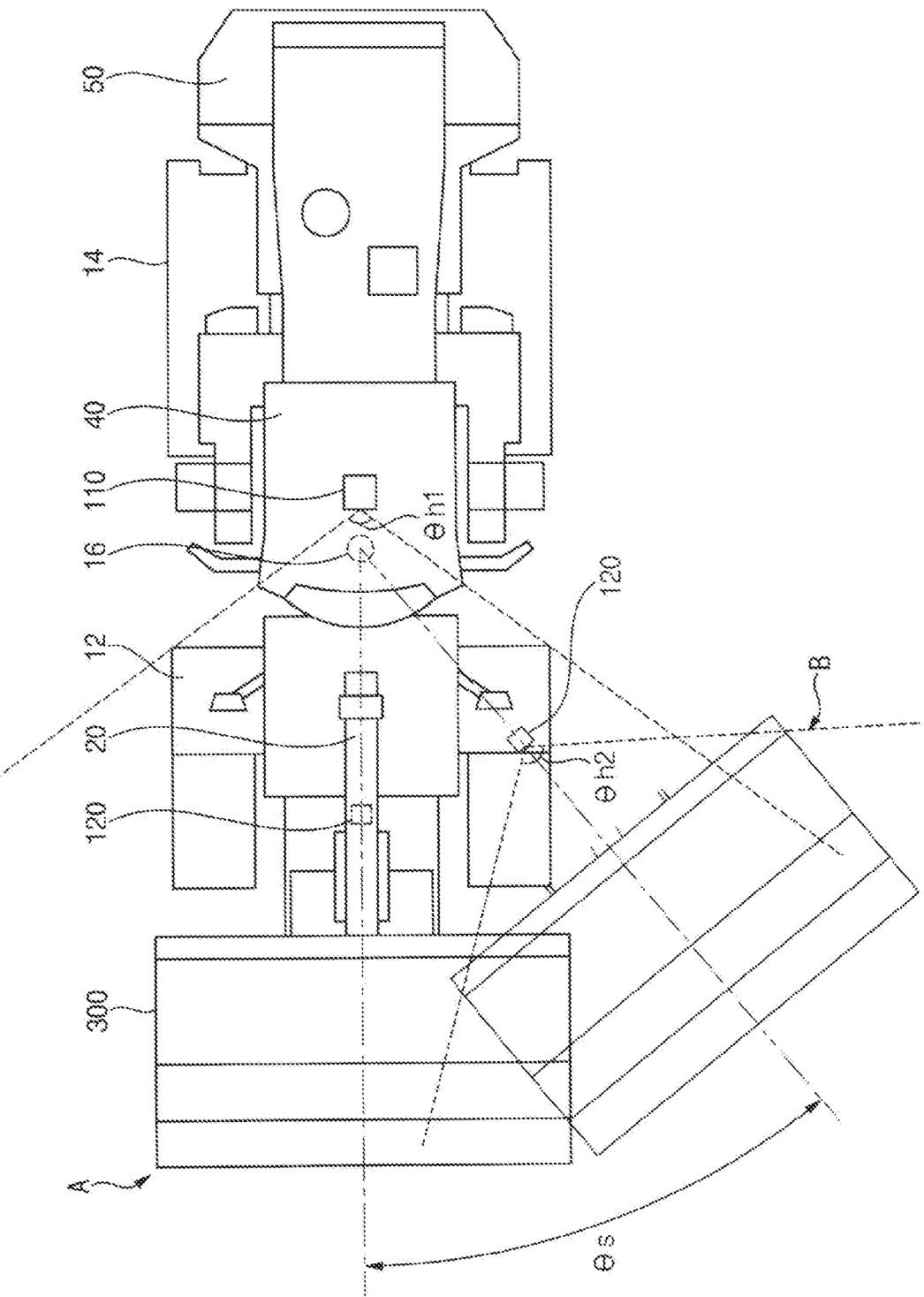
FIG. 3 is a plan view illustrating horizontal viewing angles of an upper camera and a lower camera when the construction machine of FIG. 1 travels straight ahead or turns left.
Figure 4:
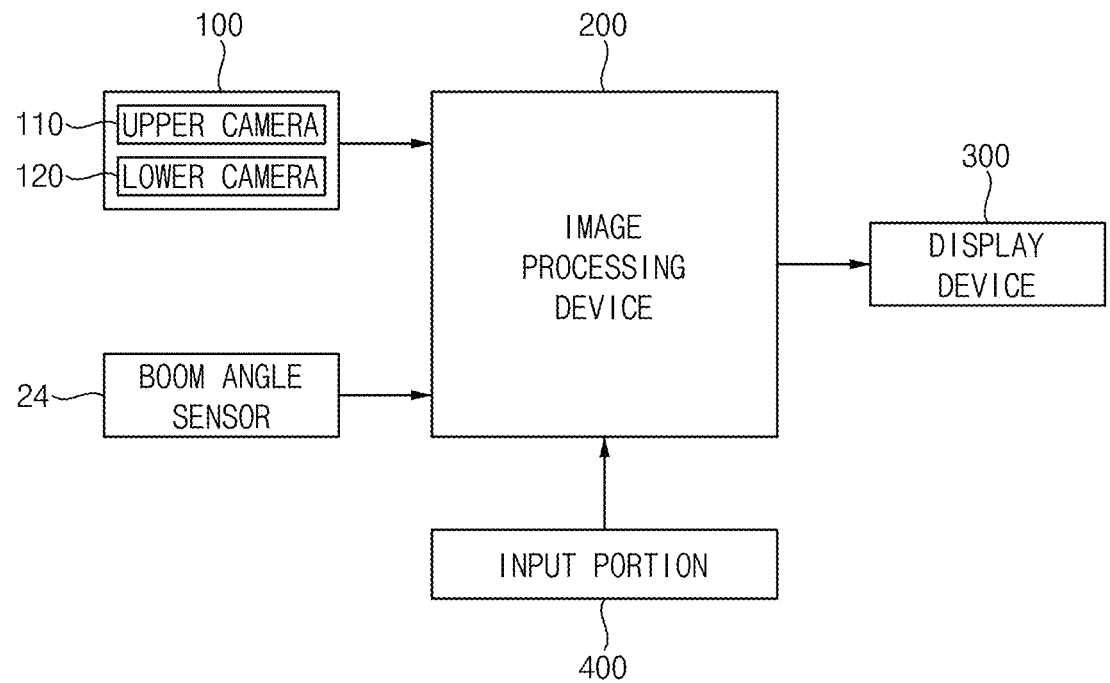
FIG. 4 is a block diagram illustrating a control system of the construction machine in FIG. 1.
Figure 5:
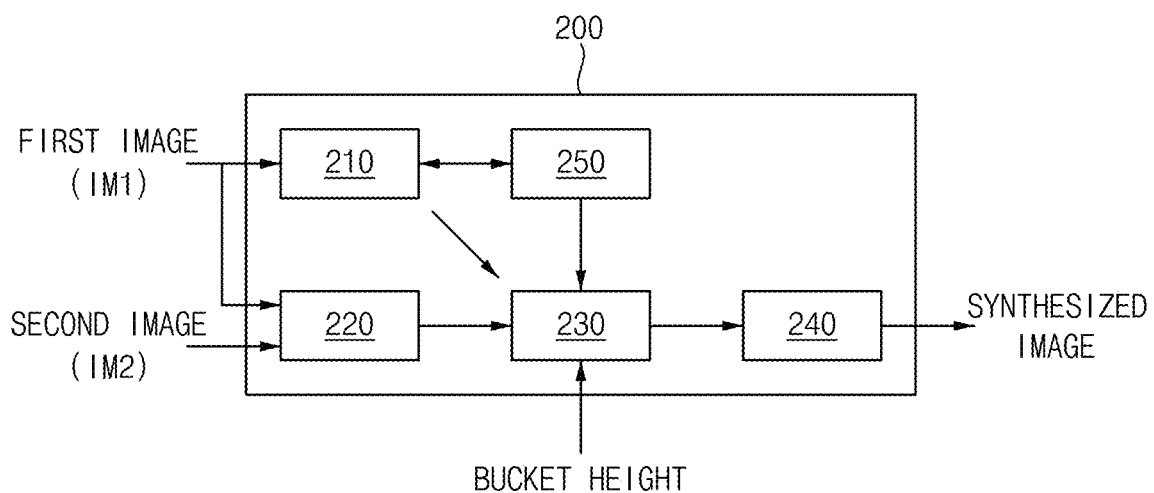
FIG. 5 is a block diagram illustrating an image processing device in FIG. 4.

FIG. 2 is a side view illustrating vertical viewing angles of an upper camera and a lower camera at an elevation position of a bucket according to a rotation angle of the boom in FIG. 1. FIG. 3 is a plan view illustrating horizontal viewing angles of an upper camera and a lower camera when the construction machine of FIG. 1 travels straight ahead or turns left. FIG. 4 is a block diagram illustrating a control system of the construction machine in FIG. 1. FIG. 5 is a block diagram illustrating an image processing device in FIG. 4.

Referring to FIGS. 1 to 5, a control system for a wheel loader may include a camera portion 100 installed in the wheel loader 10 to photograph the front of the wheel loader 10, an image processing device 200 configured to process an image from the camera portion 100 in real time, and a display device 300 configured to display the image processed by the image processing device 200. Additionally, the control system for the wheel loader may further include a work apparatus posture detection portion configured to detect a posture of the work apparatus connected to the front body 12 and an input portion configured to set an image processing condition in the image processing device 200.

The image processing device 200 for the wheel loader 10 such as a portion of an engine control unit ECU or a vehicle control unit VCU, or a separate control unit may be mounted in the rear body 14. The image processing device 200 may be implemented with dedicated hardware, software, and circuitry configured to perform the functions described herein. These elements may be physically implemented by electronic circuits such as logic circuits, discrete components, microprocessors, hard-wired circuits, memory elements, wiring connections, and the like.

In example embodiments, the camera portion 100 may monitor the front of the wheel loader 10 when the wheel loader 10 travels or works, and may include a plurality of cameras. In particular, the camera portion 100 may include an upper camera 110 installed in the driver cabin 40 and configured to photograph the front of the driver cabin 40 to capture a first image IM1 and a lower camera 120 installed in the front body 12 and configured to photograph the front of the front body 12 to capture a second image IM2. Although one upper camera and one lower camera are illustrated in FIGS. 1 and 2, it may not be limited thereto, and a plurality of the upper cameras and a plurality of the lower cameras may be provided.

The upper camera 110 may have a first vertical viewing angle (Field of View, FoV) θv1 and a first horizontal viewing angle θh1 based on the front direction of the wheel loader. For example, the first vertical viewing angle and the first horizontal viewing angle may have an angular range of 60 degrees to 120 degrees. The lower camera 120 may have a second vertical viewing angle θv2 and a second horizontal viewing angle θh2. For example, the second vertical viewing angle and the second horizontal viewing angle may have an angular range of 60 degrees to 120 degrees.

The first image may be an image captured with a focus on a front upper region through the upper camera 110, and the second image may be an image captured with a focus on a front lower region through the second camera 120.

The first vertical viewing angle θv1 of the upper camera 110 and the second vertical viewing angle θv2 of the lower camera 120 may be set to partially overlap each other and the first horizontal viewing angle θh1 of the upper camera 110 and the second horizontal viewing angle θh2 of the lower camera 120 may be set to partially overlap each other, so that the first image and the second image may partially overlap each other.

In example embodiments, the upper camera 110 may be installed to coincide with a central axis (or pivotal axis) of the center pin 16 or be installed in the rear of the central axis, and the lower camera 120 may be installed in the front of the central axis of the center pin 16.

Since the upper camera 110 and the lower camera 120 are installed at different positions with respect to the pivotal central axis, as illustrated in FIG. 3, a direction in which the upper camera 110 looks and a direction in which the lower camera 120 looks may be changed to be different from each other when the wheel loader turns left (or right). As will be described later, the image processing device 200 may synthesize the first image IM1 and the second image IM2 into one image and may process the synthesized image such that a position of a transparency processing area in which at least one of the first and second images is transparency-processed is matched with a steering angle θs of the wheel loader 10.

In example embodiments, the work apparatus posture detection portion may detect whether the work device invades the transparency processing area in a display area of the display device 300. As described later, transparency processing may be performed on the captured image when the work apparatus invades a predetermined position (matched with the steering angle), that is, an actual position corresponding to the predetermined transparency processing area among the entire display area of the display device 300, so that an operator's view may be secured. The posture of the work apparatus may include a position of the bucket 30 (a height of the bucket from the ground) or a posture of the boom 20 (a rotation angle of the boom). To this end, the work apparatus posture detection portion may include a boom angle sensor 24 for detecting the position of the bucket 30 or the posture of the boom 20. In addition, the work apparatus posture detection portion may include a bucket angle sensor (not illustrated) for detecting a relative rotation angle between the boom 20 and the bucket 30. The work apparatus posture detection portion may include a displacement sensor for detecting a stroke of the cylinder driving the boom 20, in place of the boom angle sensor 24.

Further, the work apparatus posture detection portion may include an image analysis device (for example, shape recognizer) that analyzes an image of the work apparatus captured through the camera portion to determine the posture of the work device.

The boom angle sensor 24 may detect the rotation angle of the boom 20 and provide information on the position of the bucket 30 based on the rotation angle of the boom 20. As illustrated in FIG. 2, the rotation angle of the boom 20 may be an angle θ between an extension line L at the lowest position (0%) of the boom 20 (bucket 30) and an extension line R at an elevated position of the boom 20. The rotation angle of the boom 20 at the highest position of the boom 20 (max boom height) is θmax.height, and in this case, the boom (bucket) position may be the maximum height (100%).

In example embodiments, the image processing device 200 may synthesize the first image IM1 captured from the upper camera and the second image IM2 captured from the lower camera into one, and may recognize a shape of the work apparatus in the first image IM1 to determine the steering angle θs of the front body 12 and determine the position of the transparent processing area in which at least one of the first and second images in the synthesized image is processed to be transparent according to the steering angle. The image processing device 200 may include a shape recognizer 210, an image synthesizer 220, an image processor 230, an image rendering portion 240 and a storage portion 250. The image processing device 200 may be installed in a form of a control device built in the control device or the display device of construction machinery.

In particular, the shape recognizer 210 may recognize the shape of the front work apparatus from the first image IM1 to determine the steering angle θs of the front body 12. The shape recognizer 210 may compare an actual image of the work apparatus in the first image IM1 with a learning image of the work apparatus recognized and stored in advance by machine learning to determine the steering angle θs of the work apparatus.

The work apparatus in the first image IM1 obtained from the upper camera 110 may be displayed as corresponding pixels among a plurality of pixels. Here, the front space photographed by the upper camera 110 may be expressed as grids of the same sizes, and the presence or absence of an object may be displayed in each grid.

The shape recognizer 210 may compare the actual image in the first image IM1 with the learning image of the work apparatus stored in the storage portion 250, and if the actual image and the stored image of the working apparatus match, it may be recognized as the work apparatus. Here, the learning image of the work apparatus may include images stored by machine learning various shapes of the work apparatus (e.g., boom 20 or boom cylinders) photographed by the upper camera 110.

The storage portion 250 may store a machine-learned image using an actual image of the first image IM1 received from the upper camera 110 as input data. Here, machine learning may be a field of artificial intelligence and may refer to an algorithm that enables a processing device such as a computer to learn.

The machine learning may include supervised learning such as decision tree, K-nearest neighbor (KNN), neural network and support vector machine (SVM), unsupervised learning such as clustering, reinforcement learning such as deep learning and convolutional neural networks (CNN), etc.

The shape recognizer 210 may determine the steering angle θs of the front body by determining pixel positions (start and end points) on a camera screen where the work apparatus is located, and then, the shape recognizer 210 or the transparency processor 230 may determine the position of the transparent processing area in the synthesized image according to the steering angle. The shape recognizer 210 may recognize the shape of the front work apparatus in the first image IM1 to determine whether the front body turns or not. For example, when the wheel loader 10 turns left, the steering angle θs of the front body may be determined from the pixel position of the boom 20 in the first image IM1 and the position of the transparent processing area in the synthesized image may be moved from the central region to the left by reflecting the steering angle.

The image synthesizer 220 may synthesize the first image IM1 and the second mage IM2 into one image. The image synthesizer 220 may match the first image and the second image captured by the upper camera 110 and the lower camera 120 to find portions of images that overlap (are duplicated) in the first and second images and synthesize the overlapping portions of the images to one synthesized image. The transparency processor 230 may perform transparency processing on at least one of the first and second images in the synthesized image to be transparent in the transparency processing area. The image rendering portion 240 may render the image-processed synthesized image into a 3D image. The image rendering portion 240 may process the synthesized image to be displayed like a real image and output the rendering processed image to the display device 300. The functions of the image synthesizer 220, the transparency processor 230 and the image rendering portion 240 may be implemented through a single processor such as GP or CPU for image processing, or through computational processing of separate processors.

In example embodiments, the transparency processor 230 may perform transparent processing on any one of the first and second images in the synthesized image according to the detected posture of the work apparatus. The transparency processor 220 may process the first and second images to be transparent only in the transparency processing area, that is, a partial area of the entire display area of the display device 300. The transparency processing area may be defined to include an area in which the front view is obscured by the front work apparatus including the elevating boom 20 and the bucket 30.

In the transparency processing, the portions of the first image and/or the second image within the transparency processing area of the synthesized image may be removed or translucent processed to overlap the background image, or an outline of an exterior (contour line) of the first image and/or the second image may be two-dimensionally drawn with a line or dotted line so that only the shape may be identified. In the transparency-processed image, a portion of the work apparatus that blocks the operator's front view may be synthesized into a transparent image (perspective image). In the perspective image, the portion of the work apparatus that blocks the front view may be seen through. The perspective image may be displayed by a so-called skeletal image representation technique, in which an inner region inside the outline is viewed through, with the contour line of the work apparatus being defined as a boundary. For example, the portions of the first image or the second image in the transparency processing area may be removed from the synthesized image using an alpha blending technique.

In example embodiments, the transparency processor 230 may perform transparency processing in response to a case in which at least a portion of the work apparatus invades a position corresponding to the transparency processing area. When the bucket or boom position is lower than a predetermined position (transparency switching position), which can be determined that the at least a portion of the work apparatus does not invade the transparency processing area, the second image in the synthesized image may be transparency-processed to be transparent. On the other hand, when the bucket or boom position is higher than the predetermined position (transparency switching position), which can be determined that the at least a portion of the work apparatus invades the transparency processing area, the first image in the synthesized image may be transparency-processed to be transparent. The predetermined position of the boom may be set such that the rotation angle θ of the boom 20 is within a range of 15 degrees to 20 degrees.

When the bucket 30 is positioned between the lowest position (0%) and the predetermined bucket position, that is, the transparency switching position which is the boundary of the transparency processing area, the second image captured from the lower camera 120 may be transparency-processed, so that an object implemented by the upper camera 110 may be displayed as a main point (focus). In the second image captured from the lower camera 120, when the bucket 30 is in a relatively low position, the front view of the front body 12 may be obscured by the front work apparatus including the boom 20 and the bucket 30. The transparency processor 220 may process the second image to be transparent and display the first image as a focus to thereby prevent the front view from being obscured by the front work apparatus.

When the bucket 30 is positioned between the predetermined bucket position and the highest position (100%) of the transparency processing area, the first image captured from the upper camera 110 may be transparency-processed, so that an object implemented by the lower camera 120 may be displayed as a main point (focus). In the first image captured from the upper camera 110, when the bucket 30 is in a relatively high position, the front view of the front body 12 may be obscured by the front work apparatus including the boom 20 and the bucket 30. The transparency processor 220 may process the first image to be transparent and display the second image as a focus to thereby prevent the front view from being obscured by the front work apparatus.

When the bucket 30 is lifted or lowered to pass through the predetermined bucket position (transparency switching position), an image located in the transparency processing area transparency-processed by the transparency processor 230 may be converted from the second image to the first image or from the first image to the second image.

Alternatively, the transparency processor 230 may transparency-process the second image in the synthesized image to be transparent when the rotation angle θ of the boom is within a first angle range, transparency-process the first and second images in the transparency processing area of the synthesized image to be transparent when the rotation angle θ of the boom is within a second angle range, and transparency-process the first image in the synthesized image to be transparent when the rotation angle θ of the boom is within a third angle range. For example, the first angle range may be within 0 degree to 15 degrees, the second angle range may be within 15 degrees to 25 degrees, and the third angle range may be within 25 degrees to 45 degrees.

In example embodiments, an image processing condition in the image processing device 200 may be set through an input portion 400. For example, the image processing condition may include a location, a size, etc. of the transparency processing area. As the transparency processing area is determined, the transparency switching position of the first and second images, the transparency processing area in the entire display area of the display device 300, and the like may be set. For example, the transparency switching position may represent a boundary position of the transparency processing area, and when the bucket 30 moves to be located at the boundary of the transparency processing area, the bucket 30 may be considered to be located at a predetermined position for transparency switching. The size and location of the transparency processing area, the transparency switching timing, etc. may be fixedly set by a manufacturer according to a type of equipment, and may be freely changed and set by the operator or maintenance personnel.

For example, the input unit 400 may be implemented in a form of an instrument panel option, and the operator may change the timing point for the transparency switching, the area to be processed for transparency, and the like through the input unit 400.

As mentioned above, when the transparency processing area and the transparency switching point are set, the display device 300 may display an image by dividing the image captured by the camera portion into the transparency processing area R and an external area of the transparency processing area R. The display device 300 may additionally display an outline of the transparency processing area R such that the transparency processing area R can be distinguished, or may not display the outline of the transparency processing area and may display the transparency-processed image to be connected to an image of the external area of the transparency processing area R.

Additionally, the display device 300 may display the first image in the external area of the transparency processing area R, and may display a transparency image in which at least one of the first image and the second image is displayed as a focus according to the progress of the transparency processing within the transparency processing area A.

For example, when the bucket 30 is located in the external area of the transparency processing area R, the display device 300 may display only the first image that interconnects the transparency processing area R and the external area of the transparency processing area R. Alternatively, a transparency image in which the first image is displayed as a focus may be displayed within the transparent processing area A. In this case, the operator may recognize that the display device 300 displays the first image as a whole due to the transparency image in which the first image is displayed as the focus. Additionally, when at least a portion of the bucket 30 is located within the transparency processing area A, the display device 300 may display a transparency-processed image in which the second image is displayed as a focus or the second image within the transparency processing area A, and may display the first image in which only the image in the transparency processing area R is excluded, in the external area of the transparency processing area.

Hereinafter, a method of controlling construction machinery using the control system for construction machinery in FIG. 4 will be explained. The following description will also be described based on the wheel loader as in the above-described system.

Figure 6:
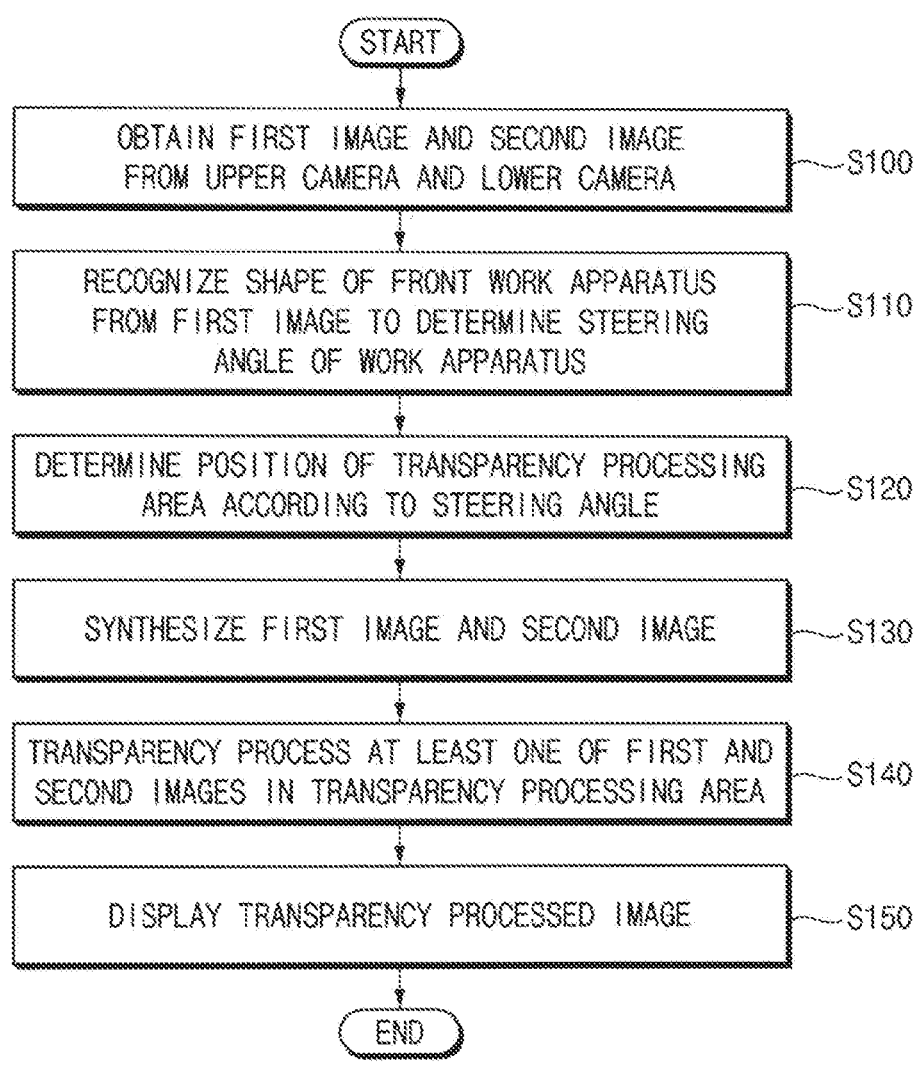
FIG. 6 is a flow chart illustrating a control method for a wheel loader in accordance with example embodiments.
Figure 7:
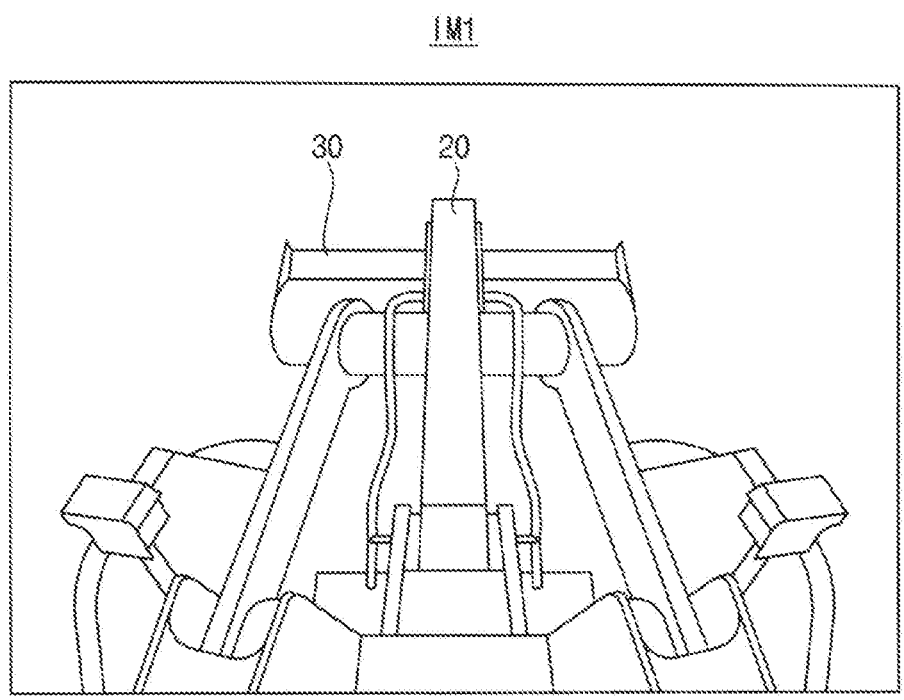
FIG. 7 is a view illustrating a front work apparatus in a first image captured by the upper camera in FIG. 4.
Figure 8:
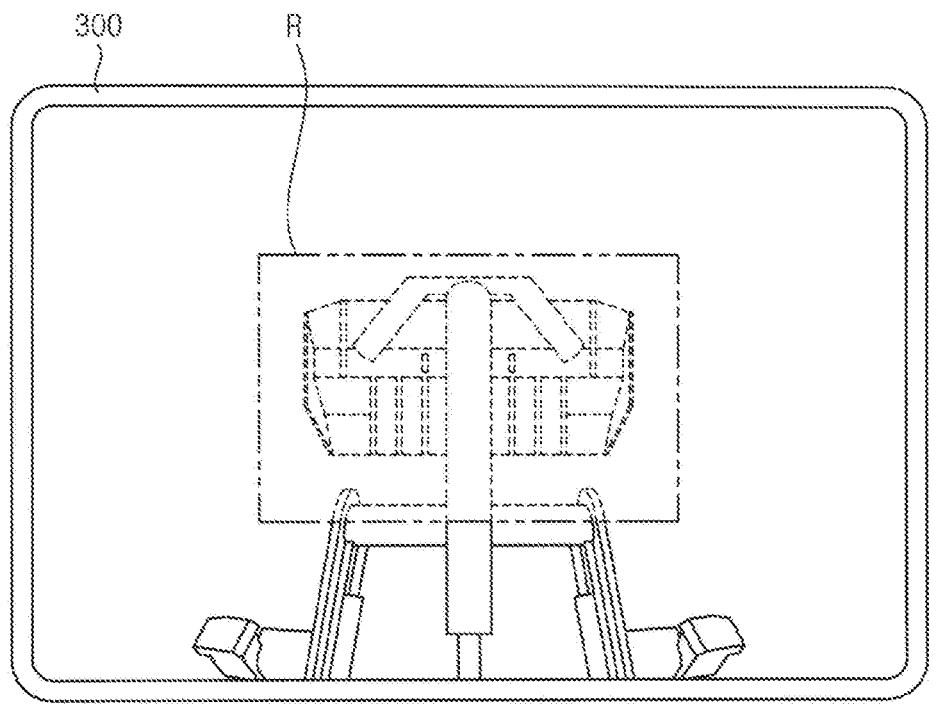
FIG. 8 is a view illustrating a screen displayed on a display device in a driver cabin when the construction machinery travels straight (state A) in FIG. 3.
Figure 9:
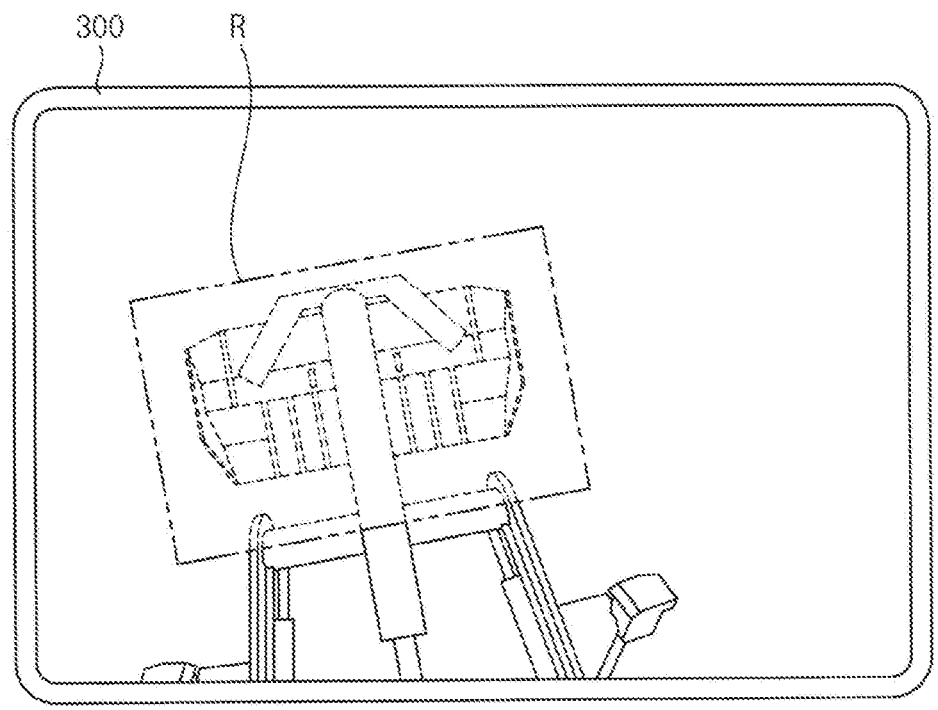
FIG. 9 is a view illustrating a screen displayed on a display device in a driver cabin when the construction machinery turns left (state B) in FIG. 3.

FIG. 6 is a flow chart illustrating a control method for a wheel loader in accordance with example embodiments. FIG. 7 is a view illustrating a front work apparatus in a first image captured by the upper camera in FIG. 4. FIG. 8 is a view illustrating a screen displayed on a display device in a driver cabin when the construction machinery travels straight (state A) in FIG. 3. FIG. 9 is a view illustrating a screen displayed on a display device in a driver cabin when the construction machinery turns left (state B) in FIG. 3.

Referring to FIGS. 1 to 9, first, a first image IM1 and a second image IM2 captured respectively through an upper camera 110 and a lower camera 120 installed in a wheel loader 10 may be obtained (S100). A shape of a front work apparatus may be recognized from the first image IM1 to determine a steering angle θs of the front work apparatus (S110), and a position of a transparency processing area R may be determined according to the steering angle θs (S120). The first image IM1 and the second image IM2 may be synthesized into one image (S130).

In example embodiments, the first image IM1 for the front of a driver cabin 40 may be obtained using the first camera 110 installed in the driver cabin 40. The second image IM2 for the front of a front body 12 may be obtained using the second camera 120 installed in the front body 12.

The first image may be an image captured with a focus on a front upper region through the upper camera 110, and the second image may be an image captured with a focus on a front lower region through the second camera 120. A first vertical viewing angle θv1 of the upper camera 110 and a second vertical viewing angle θv2 of the lower camera 120 may be set to partially overlap and a first horizontal viewing angle θh1 of the upper camera 110 and a second horizontal viewing angle θh2 of the lower camera 120 may be set to partially overlap, so that the first image and the second image may partially overlap each other.

For example, the upper camera 110 may be installed to coincide with a central axis (or pivotal axis) of a center pin 16 or be installed in the rear of the central axis, and the lower camera 120 may be installed in the front of the central axis of the center pin 16. Since the upper camera 110 and the lower camera 120 are installed at different positions with respect to the pivotal central axis, as illustrated in FIG. 3, a direction in which the upper camera 110 looks and a direction in which the lower camera 120 looks may be changed to be different from each other when the front work apparatus turns left (or right).

In example embodiments, an image processing device 200 may match the first image IM1 and the second image IM2 to synthesize the first image and the second image into one image. The image processing device 200 may recognize a shape of the front work apparatus in the first image IM1 to determine the steering angle θs of the front body 12. For example, an actual image of the front work apparatus in the first image IM1 may be compared with a learning image of the front work apparatus recognized and stored in advance by machine learning to determine the steering angle θs of the front work apparatus.

As illustrated in FIG. 7, the work apparatus in the first image IM1 obtained from the upper camera 110 may be displayed as corresponding pixels among a plurality of pixels. Here, the front space photographed by the upper camera 110 may be expressed as grids of the same sizes, and the presence or absence of an object may be displayed in each grid.

The actual image in the first image IM1 may be compared with the learning image of the work apparatus stored in advance, and if the actual image and the stored image of the working apparatus match each other, it may be recognized as the work apparatus. Here, the learning image of the work apparatus may include images stored by machine learning various shapes of the work apparatus (e.g., boom 20 or boom cylinders) photographed by the upper camera 110. Machine learning may be a field of artificial intelligence and may refer to an algorithm that enables a processing device such as a computer to learn.

Then, pixel positions (start and end points) on a camera screen where the work apparatus is located may be grasped to determine the steering angle θs of the front body, and then, the position of the transparent processing area R in the synthesized image of the first and second images may be determined according to the steering angle.

As illustrated in FIG. 8, when the wheel loader 10 travels straight, the steering angle θs of the front body may be determined from the pixel position of the boom 20 in the first image IM1 and the position of the transparent processing region in the synthesized image may be determined as the central region.

As illustrated in FIG. 9, when the wheel loader 10 turns left, the steering angle θs of the front body may be determined from the pixel position of the boom 20 in the first image IM1 and the position of the transparent processing area in the synthesized image may be moved from the central region to the left by reflecting the steering angle.

Then, at least one of the first image and the second image in the transparency processing may be transparency-processed (S140), and then, the transparency-processed synthesized image may be displayed through a display device 300 (S150).

In example embodiments, a posture of the work apparatus may be detected. A rotation angle of the boom 20 connected to the front body 12 may be detected. Information on a position of a bucket 30, that is, a height of the bucket 30 from the ground may be detected by a boom angle sensor 24. An elevated height of the bucket may be determined from the rotation angle of the boom 20 detected by the boom angle sensor 24.

As illustrated in FIG. 2, the rotation angle of the boom 20 may be an angle θ between an extension line L at the lowest position (0%) of the boom 20 and an extension line R at an elevated position of the boom 20. The rotation angle of the boom 20 at the highest position of the boom 20 (max boom height) is θmax.height, and in this case, the bucket position may be the maximum height (100%).

Then, whether or not the bucket position is lower than a predetermined position (transparency switching position) may be determined. The predetermined position may be the transparency switching position which is the boundary of the transparency processing area R. That is, the comparison between the position of the bucket and the predetermined position may include checking whether a part of the bucket 30 or the boom 20 is located within the transparency processing area R. When the bucket or the boom is lower than the predetermined position, the second image in the synthesized image may be transparency processed, and when the bucket or the boom is higher than the predetermined position, the first image in the synthesized image may be transparency processed. Here, the predetermined position may be a lower boundary of the predetermined transparency processing area R based on an image displayed through the display device 300. Then, the transparency-processed synthesized image may be displayed through the display device 300. In this case, the display device 300 may display the first image in an external area of the transparency processing area R.

In example embodiments, the image processing device 200 may perform transparency processing at least one of the first and second images to be transparent in the synthesized image according to the detected boom position.

A transparency processor 230 may transparency-process the first and second images to be transparent only in a partial area of the entire display area of the display device 300. The transparency processing area R may be defined to include an area in which the front view is obscured by the front work apparatus including the elevating boom 20 and the bucket 30.

In the transparency processing, the portions of the first image and/or the second image within the transparency processing area R of the synthesized image may be removed or translucent processed to overlap the background image, or an outline of an exterior of the first image and/or the second image may be two-dimensionally drawn with a line or dotted line so that only the shape may be identified. For example, the portions of the first image or the second image in the transparency processing area may be removed from the synthesized image using an alpha blending technique.

When the bucket 30 or the boom 20 is positioned between the lowest position (0%) and the predetermined bucket or boom position, the second image captured from the lower camera 120 may be transparency-processed, so that an object implemented by the upper camera 110 may be displayed as a main point (focus) within the transparency processing area R of the display device 300. When the bucket 30 or the boom 20 is in a relatively low position, a portion of the front work apparatus obscuring the front view in the second image may be transparency-processed so that the object may be identified in the synthesized image.

When the bucket 30 or the boom 20 is positioned between the predetermined position and the highest position (100%), the first image captured from the upper camera 110 may be transparency-processed, so that an object implemented by the lower camera 120 may be displayed as a main point (focus) within the transparency processing area R of the display device 300. When the bucket 30 or the boom 20 is in a relatively high position, a portion of the front work apparatus obscuring the front view in the first image may be transparency-processed so that the object may be identified in the synthesized image.

For example, the predetermined position of the boom may be set such that the rotation angle θ of the boom 20 is within a range of 15 degrees to 20 degrees.

Alternatively, the second image in the synthesized image may be transparency-processed to be transparent when the rotation angle θ of the boom is within a first angle range, the first and second images in the transparency processing area of the synthesized image may be transparency-processed to be transparent when the rotation angle θ of the boom is within a second angle range, and the first image in the synthesized image may be transparency-processed to be transparent when the rotation angle θ of the boom is within a third angle range. For example, the first angle range may be within 0 degree to 15 degrees, the second angle range may be within 15 degrees to 25 degrees, and the third angle range may be within 25 degrees to 45 degrees.

In example embodiments, an image processing condition for transparency processing the first and second images may be set. The image processing condition in the image processing device 200 may be set through an input portion 400. For example, the image processing condition may include a location, a size, etc. of the transparency processing area. A transparency switching timing of the first and second images may be determined based on the position of the bucket 30 or the bucket 20 and the predetermined bucket or boom position. The transparency processing area may be selected according to a type of equipment.

For example, the input unit 400 may be implemented in a form of an instrument panel option, and the operator may change the timing point for the transparency switching, the area to be processed for transparency, and the like through the input unit 400. The input unit 400 may be provided in a form of a separate manipulation device provided in the driver cabin, a manipulation device integrally provided with the display device, or a touch screen constituting a display screen of the display device. Thus, the operator may set various image processing conditions such as setting a periphery of the object requiring attention during work as the transparent processing area.

As mentioned above, the first image and the second image captured from the upper camera 110 installed in the driver cabin 40 of the wheel loader 10 and the lower camera 120 installed in the front body 12 may be synthesized into one image, the position of the transparent processing area in the synthesized image may be determined according to the steering angle θs of the front body 12, at least one of the first and second images may be transparency-processed to be transparent in the synthesized image, and the transparency-processed image may be displayed through the display device 300.

When the bucket 30 or the boom 20 is in a relatively low position between the lowest position (0%) and the predetermined bucket position, in the second image captured from the lower camera 120, the front view of the front body 12 may be obscured by the front work apparatus including the boom 20 and the bucket 30. When the bucket 30 is in a relatively high position between the predetermined bucket position and the highest position (100%) of the transparency processing area, in the first image captured from the upper camera 110, the front view of the front body 12 may be obscured by the front work apparatus including the boom 20 and the bucket 30.

The first image or the second image may be transparency-processed in the synthesized image according to the position of the bucket 30 or the boom 20, to remove a blind spot that is obscured by the front work apparatus.

In addition, since the upper camera 110 and the lower camera 120 are installed at different positions, during steering the bucket 30 may be out of the transparency processing area R, so the image of the bucket may not be transparency-processed to obscure the front view. When steering the wheel loader 10, the shape of the front work apparatus may be recognized from the first image IM1 to determine the steering angle θs of the front body 12 and the synthesized image may be processed such that the position of the transparency processing area R is matched with the steering angle θs.

Accordingly, even when the wheel loader 10 is steered, it may be possible to prevent the front view from being blocked by the front work apparatus including the boom 20 and the bucket 30. Thus, the operator's cognitive ability may be increased to secure stability, to thereby prevent safety accidents in advance.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A control system for construction machinery, the control system comprising:
    an upper camera installed in a driver cabin in a rear body to photograph the front of the driver cabin;
    a lower camera installed in a front body rotatably connected to the rear body through a center pin to photograph the front of the front body;
    an image processing device configured to synthesize first and second images captured from the upper camera and the lower camera into one image, and configured to detect a shape of a front work apparatus in the first image to determine a steering angle of the front body and determine a position of a transparency processing area in which at least one of the first and second images is transparency-processed in the synthesized image according to the steering angle; and
    a display device configured to display the synthesized image transparency-processed by the image processing device,
    wherein the upper camera is installed to coincide with a central axis of the center pin or in the rear of the central axis and the lower camera is installed in the front of the central axis,
    wherein the upper camera and the lower camera are installed at a different height from each other,
    wherein the image processing device includes:
        a shape recognizer configured to recognize the shape of the front work apparatus from the first image to determine the steering angle of the front body; and
        a transparency processor configured to determine the position of the transparent processing area in the synthesized image according to the determined steering angle, and
    wherein the shape recognizer compares an actual image of the front work apparatus in the first image received from the upper camera with a learning image of the front work apparatus recognized and stored in advance by machine learning to determine the steering angle of the front work apparatus.

2. The control system for construction machinery of claim 1, wherein the image processing device further includes a storage portion configured to store a learning image of the front work apparatus by executing a deep learning algorithm using the actual image received from the shape recognizer as input data.

3. The control system for construction machinery of claim 1, further comprising:
    a work apparatus posture detection portion configured to detect a posture of the front work apparatus,
    wherein the image processing device transparency-processes at least one of the first and second images in the transparency processing area according to the posture of the work apparatus detected by the work apparatus posture detection portion.

4. The control system for construction machinery of claim 3, wherein the image processing device transparency-processes the first image in the transparency processing area when at least a portion of the front work apparatus invades a predetermined position, and the image processing device transparency-processes the second image in the transparency processing area when the front work apparatus does not invade the predetermined position.

5. The control system for construction machinery of claim 1, further comprising:
    an input portion configured to set an image processing condition in the image processing device.

6. The control system for construction machinery of claim 5, wherein the image processing condition includes a transparency processing switching timing of the first and second images or a size of the transparency processing area of the entire display area of the display device.

7. A control system for construction machinery, the control system comprising:
    an upper camera installed in a driver cabin in a rear body to photograph the front of the driver cabin;
    a lower camera installed in a front body rotatably connected to the rear body through a center pin to photograph the front of the front body;

an image processing device configured to synthesize first and second images captured from the upper camera and the lower camera into one image, and configured to detect a shape of a front work apparatus in the first image to determine whether or not the front body turns and determine a position of a transparency processing area in which at least one of the first and second images is transparency-processed in the synthesized image depending on whether or not the front body turns; and a display device configured to display the synthesized image transparency-processed by the image processing device, wherein the upper camera is installed to coincide with a central axis of the center pin or in the rear of the central axis and the lower camera is installed in the front of the central axis, wherein the upper camera and the lower camera are installed at a different height from each other, wherein the image processing device includes:
- a shape recognizer configured to recognize the shape of the front work apparatus from the first image to determine whether or not the front body turns; and
- a transparency processor configured to determine the position of the transparent processing area in the synthesized image in response to turning of the front body, and wherein the shape recognizer compares an actual image of the front work apparatus in the first image received from the upper camera with a learning image of the front work apparatus recognized and stored in advance by machine learning to determine whether or not the front body turns.

8. The control system for construction machinery of claim 7, wherein the image processing device recognizes the shape of the front work apparatus from the first image to determine a steering angle of the front body, and determines the position of the transparent processing area in the synthesized image according to the determined steering angle.

9. A method of controlling construction machinery, the method comprising:
- obtaining a first image of the front of a driver cabin from an upper camera installed in the drive cabin in a rear body;
- obtaining a second image of the front of a front body from a lower camera installed in the front body rotatably connected to the rear body through a center pin;
- detecting, by a shape recognizer, a shape of a front work apparatus from the first image to determine a steering angle of the front body;
- synthesizing the first and second images into one image;
- determining, by a transparency processor, a position of a transparency processing area in the synthesized image according to the steering angle;
- transparency-processing at least one of the first and second images in the transparency processing area; and
- displaying the transparency-processed image through a display device, wherein the upper camera is installed to coincide with a central axis of the center pin or in the rear of the central axis and the lower camera is installed in the front of the central axis, wherein the upper camera and the lower camera are installed at a different height from each other, and wherein determining the steering angle of the front body from the first image includes comparing an actual image of the front work apparatus in the first image received from the upper camera with a learning image of the front work apparatus recognized and stored in advance by machine learning to determine the steering angle of the front work apparatus.

10. The method of claim 9, further comprising:
obtaining the learning image of the front work apparatus by executing a deep learning algorithm using the actual image as input data.

11. The method of claim 9, further comprising:
detecting a posture of the front work apparatus,
wherein transparency-processing the at least one of the first and second images in the transparency processing area includes transparency-processing the at least one of the first and second images according to the detected posture of the front work apparatus.

12. The method of claim 9, further comprising:
setting an image processing condition for transparency processing of the first and second images.

13. The method of claim 12, wherein the image processing condition includes a transparency processing switching timing of the first and second images or a size of the transparency processing area of the entire display area of the display device.

* * * * *